United States Patent
Lin et al.

(10) Patent No.: US 9,137,863 B2
(45) Date of Patent: Sep. 15, 2015

(54) ILLUMINATION DEVICE POWER CONTROL MODULE

(71) Applicant: WINTEK CORPORATION, Taichung (TW)

(72) Inventors: Ming-Chuan Lin, Taichung (TW); Zhi-Ting Ye, Miaoli County (TW); Shih-Chuan Lin, Taichung (TW); Ming-Hsueh Lee, Taichung (TW)

(73) Assignee: WINTEK CORPORATION, Taichung (TW)

( * ) Notice: Subject to any disclaimer, the term of this patent is extended or adjusted under 35 U.S.C. 154(b) by 0 days.

(21) Appl. No.: 14/308,724

(22) Filed: Jun. 19, 2014

(65) Prior Publication Data

US 2014/0375215 A1 Dec. 25, 2014

(30) Foreign Application Priority Data

Jun. 19, 2013 (TW) .............................. 102211437 U

(51) Int. Cl.
*H05B 37/02* (2006.01)
*H05B 33/08* (2006.01)

(52) U.S. Cl.
CPC ........ *H05B 33/0809* (2013.01); *H05B 33/0815* (2013.01); *H05B 33/0848* (2013.01)

(58) Field of Classification Search
USPC ...................... 315/209 R, 247, 291, 307, 308
See application file for complete search history.

(56) References Cited

U.S. PATENT DOCUMENTS

| | | | | |
|---|---|---|---|---|
| 8,330,388 B2 * | 12/2012 | Kuo et al. | ...................... | 315/291 |
| 8,339,063 B2 * | 12/2012 | Yan et al. | ...................... | 315/291 |
| 8,378,588 B2 * | 2/2013 | Kuo et al. | ...................... | 315/291 |
| 8,378,589 B2 * | 2/2013 | Kuo et al. | ...................... | 315/291 |
| 8,519,634 B2 * | 8/2013 | Lyons | ............................ | 315/291 |
| 2010/0148681 A1 * | 6/2010 | Kuo et al. | ...................... | 315/193 |

* cited by examiner

*Primary Examiner* — Thuy Vinh Tran
(74) *Attorney, Agent, or Firm* — Ming Chow; Sinorica, LLC

(57) ABSTRACT

An illumination device power control module is capable of dynamically adjusting power consumption of a light-emitting diode (LED) illumination device by adjusting the output voltage to different levels to control the power of the light emitting diode illumination device. An alternating current power source terminal is configured to receive an alternating current voltage. A rectifier is configured to convert the alternating current voltage to a rectified voltage.

23 Claims, 6 Drawing Sheets

ILLUMINATION DEVICE POWER CONTROL MODULE

BACKGROUND OF THE INVENTION

1. Field of the Invention

The present invention discloses an illumination device power control module, and more particularly, to an illumination device power control module capable of providing different values of power by switching different sets of values of output voltages.

2. Description of the Prior Art

Light emitting diode (LED) luminaires are becoming replacements for conventional luminaires, since LED luminaires have the vantages including high illuminating efficiency and low power consumption. However, since the conventional luminaires do not have a function of controlling their illuminating power, unnecessary power consumption is significantly introduced when their user is not near the conventional luminaires or when surrounding luminance of the conventional luminaires are over-high.

SUMMARY OF THE INVENTION

A first embodiment of the present invention presents an illumination device power control module. The illumination device power control module comprises an alternating current (AC) power source terminal configured to receive an AC voltage, a rectifier configured to convert the AC voltage to a rectified voltage, a valley-fill power factor correction circuit, a regulator having a voltage supply terminal coupled to the rectifier, the regulator being configured to generate a stable voltage on the voltage supply terminal, a control unit having a power supply terminal coupled to the voltage supply terminal of the regulator and configured to receive the stable voltage and a current sensing terminal configured to generate a first predetermined potential and to convert the first predetermined potential to a second predetermined potential according to a change in the stable voltage to perform multistage brightness control (the first predetermined potential being not equal to the second predetermined potential), a second inductor having a first terminal coupled to a second terminal of the regulator and a positive output voltage terminal of the illumination device power control module and a second terminal coupled to a ground terminal of the control unit (symbol shown in FIG. 1), an eighth capacitor having a first terminal coupled to the first terminal of the rectifier and a second terminal coupled to the second terminal of the rectifier, a second resistor having a first terminal coupled to the second terminal of the first inductor and a second terminal coupled to a first terminal of the regulator, a third capacitor having a first terminal coupled to the first terminal of the second inductor and a second terminal coupled to the ground terminal (symbol shown in FIG. 1), a sixth capacitor having a first terminal coupled to a reference voltage terminal of the control unit and a second terminal coupled to the ground terminal of the control unit, a seventh capacitor having a first terminal coupled to the current sensing terminal of the control unit and a second terminal coupled to the second terminal of the sixth capacitor, a ninth capacitor having a first terminal coupled to the first terminal of the rectifier and the power supply terminal of the control unit and a second terminal coupled to the ground terminal of the control unit, an eighth resistor having a first terminal coupled to an overvoltage protection terminal of the control unit and a second terminal coupled to a second terminal of the regulator, a shunt resistor having a first terminal coupled to the second terminal of the second inductor and the ground terminal of the control unit, a transistor having a first terminal coupled to a drive terminal of the control unit and a second terminal coupled to a second terminal of the shunt resistor and the current sensing terminal of the control unit and a third terminal coupled to the second terminal of the first inductor, and a fourth diode having a negative bias terminal coupled to the second terminal of the transistor and a positive bias terminal coupled to the ground terminal. The valley-fill power factor correction circuit comprises a first inductor having a first terminal coupled to a first terminal of the rectifier, a first resistor having a first terminal coupled to the first terminal of the first inductor and a second terminal coupled to a second terminal of the rectifier and the ground terminal, a first capacitor having a first terminal coupled to a second terminal of the first inductor, a first diode having a positive bias terminal coupled to the second terminal of the first resistor and a negative bias terminal coupled to a second terminal of the first capacitor, a second diode having a positive bias terminal coupled to the negative bias terminal of the first diode, a third diode having a positive bias terminal coupled to a negative bias terminal of the second diode and a negative bias terminal coupled to the first terminal of the first capacitor, and a second capacitor having a first terminal coupled to the positive bias terminal of the third diode and a second terminal coupled to the positive bias terminal of the first diode.

A second embodiment of the present invention presents an illumination device power control module. The illumination device power control module comprises an alternating current (AC) power source terminal configured to receive an AC voltage, a rectifier configured to convert the AC voltage to a rectified voltage, a valley-fill power factor correction circuit, a regulator having a voltage supply terminal coupled to the rectifier, the regulator being configured to generate a stable voltage on the voltage supply terminal, a control unit having a power supply terminal coupled to the voltage supply terminal of the regulator and configured to receive the stable voltage and a current sensing terminal configured to generate a first predetermined potential and to convert the first predetermined potential to a second predetermined potential according to a change in the stable voltage to perform multistage brightness control, a second inductor having a first terminal coupled to a second terminal of the regulator and a positive output voltage terminal of the illumination device power control module and a second terminal coupled to a ground terminal of the control unit, an eighth capacitor having a first terminal coupled to the first terminal of the rectifier and a second terminal coupled to the second terminal of the rectifier, a second resistor having a first terminal coupled to the second terminal of the first inductor and a second terminal coupled to a first terminal of the regulator, a third capacitor having a first terminal coupled to the first terminal of the second inductor and a second terminal coupled to the ground terminal, a sixth capacitor having a first terminal coupled to a reference voltage terminal of the control unit and a second terminal coupled to the ground terminal of the control unit, a seventh capacitor having a first terminal coupled to the current sensing terminal of the control unit and a second terminal coupled to the second terminal of the sixth capacitor, a ninth capacitor having a first terminal coupled to the first terminal of the rectifier and the power supply terminal of the control unit and a second terminal coupled to the ground terminal of the control unit, an eighth resistor having a first terminal coupled to an overvoltage protection terminal of the control unit and a second terminal coupled to a second terminal of the regulator, a shunt resistor having a first terminal coupled to the second terminal of the second inductor and the ground terminal of the control unit, an n-type metal-oxide-semiconductor field effect transistor (NMOS transistor) having a first terminal coupled to a drive terminal of the control unit and a second terminal coupled to a second terminal of the shunt resistor and the current sensing terminal of the control unit and a third terminal coupled to the second terminal of the first inductor, and a fourth diode having a negative bias terminal coupled to the second terminal of the transistor and a positive bias terminal coupled to the ground terminal. The valley-fill power factor correction circuit comprises a first inductor having a first terminal coupled to a first terminal of the rectifier, a first resistor having a first terminal coupled to the first terminal of the first inductor and a second terminal coupled to a second terminal of the rectifier and the ground terminal, a first capacitor having a first terminal coupled to a second terminal of the first inductor, a first diode having a positive bias terminal coupled to the second terminal of the first resistor and a negative bias terminal coupled to a second terminal of the first capacitor, a second diode having a positive bias terminal coupled to the negative bias terminal of the first diode, a third diode having a positive bias terminal coupled to a negative bias terminal of the second diode and a negative bias terminal coupled to the first terminal of the first capacitor, and a second capacitor having a first terminal coupled to the positive bias terminal of the third diode and a second terminal coupled to the positive bias terminal of the first diode. The first predetermined potential may not be equal to the second predetermined potential.

A third embodiment of the present invention presents an illumination device power control module. The illumination device power control module comprises an alternating current (AC) power source terminal configured to receive an AC voltage, a rectifier configured to convert the AC voltage to a rectified voltage, a valley-fill power factor correction circuit, a regulator having a voltage supply terminal coupled to the rectifier, the regulator being configured to generate a stable voltage on the voltage supply terminal, a control unit having a power supply terminal coupled to the voltage supply terminal of the regulator and configured to receive the stable voltage and a current sensing terminal configured to generate a first predetermined potential and to convert the first predetermined potential to a second predetermined potential according to a change in the stable voltage to perform multistage brightness control, a second inductor having a first terminal coupled to a second terminal of the regulator and a positive output voltage terminal of the illumination device power control module and a second terminal coupled to a ground terminal of the control unit, an eighth capacitor having a first terminal coupled to the first terminal of the rectifier and a second terminal coupled to the second terminal of the rectifier, a second resistor having a first terminal coupled to the second terminal of the first inductor and a second terminal coupled to a first terminal of the regulator, a third capacitor having a first terminal coupled to the first terminal of the second inductor and a second terminal coupled to the ground terminal, a sixth capacitor having a first terminal coupled to a reference voltage terminal of the control unit and a second terminal coupled to the ground terminal of the control unit, a seventh capacitor having a first terminal coupled to the current sensing terminal of the control unit and a second terminal coupled to the second terminal of the sixth capacitor, a ninth capacitor having a first terminal coupled to the first terminal of the rectifier and the power supply terminal of the control unit and a second terminal coupled to the ground terminal of the control unit, an eighth resistor having a first terminal coupled to an overvoltage protection terminal of the control unit and a second terminal coupled to a second terminal of the regulator, a light sensor having a first terminal coupled to the second terminal of the second inductor and the ground terminal of the control unit, an n-type metal-oxide-semiconductor field effect transistor (NMOS transistor) having a first terminal coupled to a drive terminal of the control unit and a second terminal coupled to a second terminal of the light sensor and the current sensing terminal of the control unit and a third terminal coupled to the second terminal of the first inductor, and a fourth diode having a negative bias terminal coupled to the second terminal of the transistor and a positive bias terminal coupled to the ground terminal. The valley-fill power factor correction circuit comprises a first inductor having a first terminal coupled to a first terminal of the rectifier, a first resistor having a first terminal coupled to the first terminal of the first inductor and a second terminal coupled to a second terminal of the rectifier and the ground terminal, a first capacitor having a first terminal coupled to a second terminal of the first inductor, a first diode having a positive bias terminal coupled to the second terminal of the first resistor and a negative bias terminal coupled to a second terminal of the first capacitor, a second diode having a positive bias terminal coupled to the negative bias terminal of the first diode, a third diode having a positive bias terminal coupled to a negative bias terminal of the second diode and a negative bias terminal coupled to the first terminal of the first capacitor, and a second capacitor having a first terminal coupled to the positive bias terminal of the third diode and a second terminal coupled to the positive bias terminal of the first diode. The light sensor having a resistance value adjusted to be proportional to brightness of around the illumination device power control module. The first predetermined potential may not be equal to the second predetermined potential.

A fourth additional embodiment of the present invention presents illumination device power control module. The illumination device power control module comprises an AC power source terminal configured to receive an AC voltage, a rectifier configured to convert the AC voltage to a rectified voltage, a regulator having a voltage supply terminal coupled to the rectifier, and a control unit having a power supply terminal coupled to the voltage supply terminal of the regulator for receiving the stable voltage, and a current sensing terminal configured to generate a first predetermined potential, and to convert the first predetermined potential to a second predetermined potential according to a change in the stable voltage to perform multistage brightness control. The first predetermined potential may not be equal to the second predetermined potential. The regulator configured to generate a stable voltage on the voltage supply terminal.

A fifth additional embodiment of the present invention presents illumination device power control module. The illumination device power control module comprises an AC power source terminal configured to receive an AC voltage, a rectifier configured to convert the AC voltage to a rectified voltage, a control unit having a power supply terminal coupled to the first terminal of the rectifier for receiving the stable voltage and a current sensing terminal configured to generate a first predetermined potential, and to convert the first predetermined potential to a second predetermined potential according to a change in the stable voltage to perform multistage brightness control, and a zener diode having a first terminal coupled to the first terminal of the rectifier and a second terminal coupled to a ground terminal of the control unit. The first predetermined potential may not be equal to the second predetermined potential.

These and other objectives of the present invention will no doubt become obvious to those of ordinary skill in the art after reading the following detailed description of the preferred embodiment that is illustrated in the various figures and drawings.

DETAILED DESCRIPTION

For preventing unnecessary power consumption in a light emitting diode illumination device, the present invention discloses an illumination device power control module capable of adjusting the output voltage to different levels to control the power of an illumination device. However, the following described embodiments of the present invention are mere examples and is not meant to limit the embodiments of the present invention.

Figure 1:
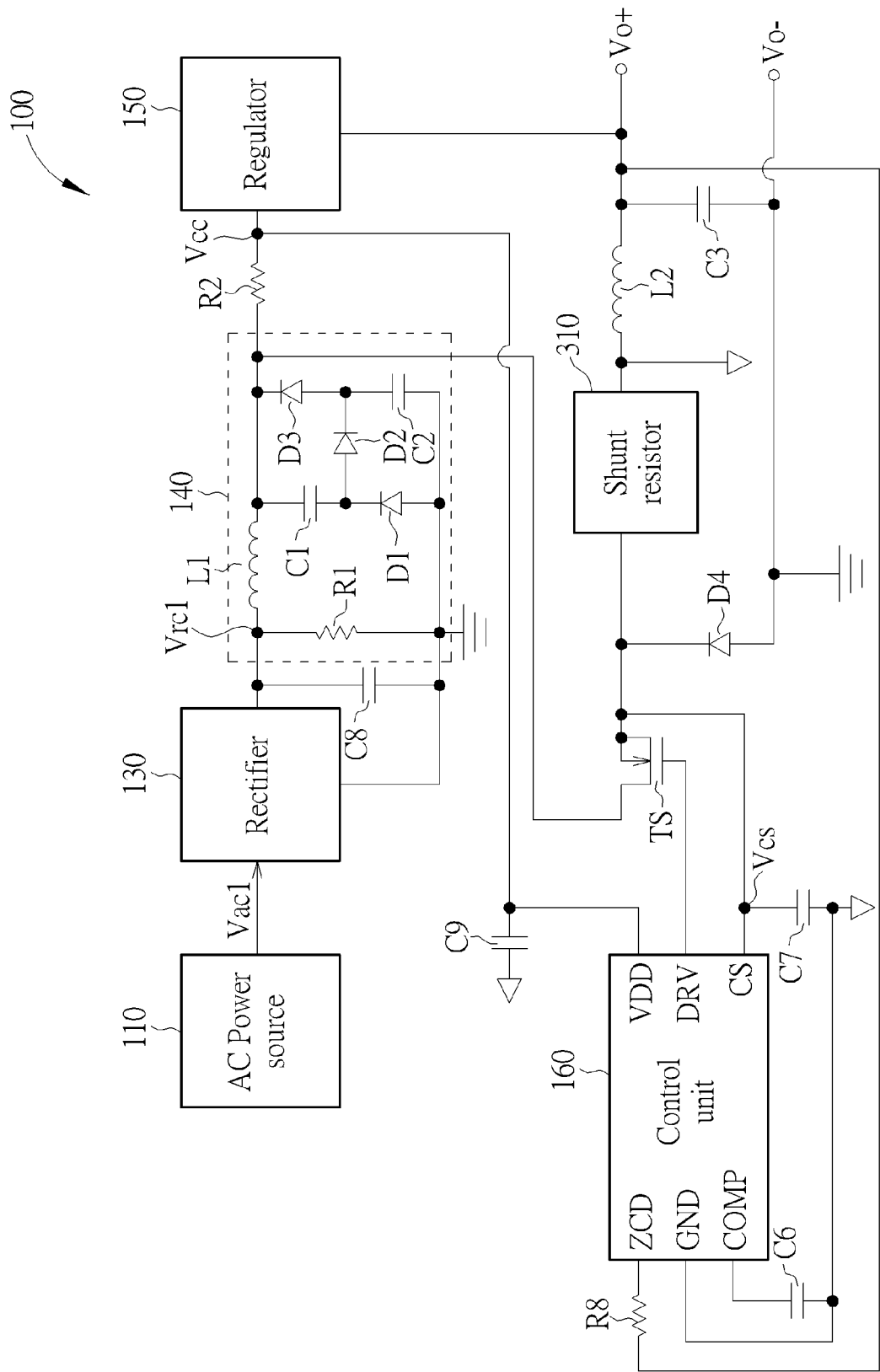
FIGS. 1-6 illustrate an illumination device power control module according to some embodiments of the present invention.

FIG. 1 illustrates an illumination device power control module 100 according to an embodiment of the present invention. As shown in FIG. 1, the illumination device power control module 100 includes at least an alternating current (AC) power source terminal 110, a rectifier 130, a valley-fill power factor correction circuit 140, a regulator 150, a control unit 160, a shunt resistor 310, and a transistor TS.

The AC power source terminal 110 is configured to provide an AC voltage Vac1. The rectifier 130 may be coupled to the AC power source terminal 110 for receiving the AC voltage Vac1 and rectifying the AC voltage Vac1 to generate a rectified voltage Vrc1. The rectifier 130 may be a half wave rectifier or a full wave rectifier.

The valley-fill power factor correction circuit 140 may be coupled to a first terminal of the rectifier 130 for receiving the rectified voltage Vrc1 to generate a stable voltage Vcc. The valley-fill power factor correction circuit 140 may be used to increase the power factor of the rectified voltage Vrc1 and generate the stable voltage Vcc having a higher power factor and being more stable.

The valley-fill power factor correction circuit 140 may include an inductor L1, a resistor R1, capacitors C1 and C2, and diodes D1, D2, and D3. The inductor L1 has a first terminal coupled to a first terminal of the rectifier 130 for receiving the rectified voltage Vrc1 and for generating a rectified voltage Vrc2. The inductor L1 may be used for raising a power factor of the rectified voltage Vrc1 so as to generate the rectified voltage Vrc2 having a higher power factor and more stable than the rectified Vrc1. The resistor R1 has a first terminal coupled to a first terminal of the inductor L1 and a second terminal coupled to a second terminal of the rectifier 130 and a ground terminal. The resistor R1 may be used to provide an effective discharge path for shortening the discharge time when the rectified voltage Vrc1 is lowered because of temporary shut-down of the AC power source terminal 110, so as to respond to rapid on/off switching of the AC power source terminal 110. The capacitor C1 has a first terminal coupled to a second terminal of the inductor L1. The diode D1 has a positive bias terminal coupled to the second terminal of the resistor R1, and a negative bias terminal coupled to a second terminal of the capacitor C1. The diode D2 has a positive bias terminal coupled to the negative bias terminal of the diode D1. The diode D3 has a positive bias terminal coupled to a negative bias terminal of the diode D2 and a negative bias terminal coupled to the first terminal of the capacitor C1. The capacitor C2 has a first terminal coupled to the positive bias terminal of the diode D3 and a second terminal coupled to the positive bias terminal of the diode D1.

The illumination device power control module 100 further includes a resistor R2 having a first terminal coupled to the second terminal of the valley-fill power factor correction circuit 140.

The regulator 150 may be used to generate a stable voltage Vcc on the voltage supply terminal according to a voltage from a positive output terminal Vo+ of the illumination device power control module 100.

The control unit 160 has a power supply terminal VDD coupled to the first terminal of the regulator 150 for receiving the stable voltage Vcc. The control unit 160 may be configured to adjust a voltage of a sense voltage Vcs at a current sensing terminal CS according to the voltage of the stable voltage Vcc. The voltage level of the sense voltage Vcs may be adjusted to at least three different output voltages. For example, through a stable voltage Vcc of an external switch having a high level (i.e. 12V) decreased to a low level (i.e. 0V) and low level to high level, the voltage level of the sense voltage Vcs may be converted from a first predetermined potential to a second predetermined potential. Therefore, the switching of the voltage level of the sense voltage Vcs may control the current strength of the light emitting diode illumination device and perform multi-level brightness control.

The illumination device power control module 100 may further include an inductor L2 and a shunt resistor 310. The inductor L2 has a first terminal coupled to a second terminal of the regulator 150 and a positive output terminal Vo+ of the illumination device power control module 100 and a second terminal coupled to the ground terminal of the control unit. The shunt resistor 310 has a first terminal coupled to the second terminal of the inductor L2 and the ground terminal of the control unit. The resistor R4 is coupled to the resistor R3 in parallel.

The n-type metal-oxide-semiconductor field effect transistor TS has a gate coupled to a drive terminal DRV of the control unit 160, a source coupled to a second terminal of the shunt resistor 310 and a current sensing terminal CS of the control unit 160, and a drain coupled to a second terminal of valley-fill power factor correction circuit 140. In some embodiment of the present invention, the n-type metal-oxide-semiconductor field effect transistor TS may be replaced with a p-type metal-oxide-semiconductor field effect transistor, an npn bipolar junction transistor, a pnp bipolar junction transistor, an n-type junction field effect transistor, a p-type junction field effect transistor, an n-type metal semiconductor field effect transistor, or a p-type metal semiconductor field effect transistor. Those skilled in the art would readily observe that other types of transistors may be used to implement embodiments of the present invention. Therefore, such modifications shall be covered by the present invention.

According to the characteristics of the above-mentioned elements, operations of the illumination device power control module 100 are described as the following paragraph:

When the AC power source terminal 110 is outputting a voltage, the valley-fill power factor correction circuit 140 may be used to adjust the current to form a sine wave having a same phase as an input voltage and may achieve power factor correction. A capacitor C9 is charged at this time. When the power supply voltage VDD of the control unit 160 reaches lowest operating voltage, the drive terminal DRV of the control unit 160 may start to deliver Hi/Lo square wave signal to the gate of the n-type metal-oxide-semiconductor field effect transistor TS. The n-type metal-oxide-semiconductor field effect transistor TS may start to perform an ON/OFF action. When the n-type metal-oxide-semiconductor field effect transistor TS is ON, the current passing through the shunt resistor 310 and start to charge the inductor L2. And the output current value of the positive output terminal Vo+ was determined according to the reference voltage from the current sensing terminal CS of the control unit 160. When the n-type metal-oxide-semiconductor field effect transistor TS is OFF, inductor L2 forms a loop with the capacitor C3, the diode C4 and shunt resistor 310 to discharge. At the same time, capacitor C3 is charged and the positive output terminal Vo+ may supply the illumination device with required voltage and current. The repetitive action (i.e. repeatedly turning the n-type metal-oxide-semiconductor field effect transistor TS between the ON/OFF state, ON→OFF→ON→OFF . . . ) may allow the light emitting diode illumination device to have a stable power source.

The illumination device power control module 100 can be connected to a conventional household lamp switch. When the lamp switch is continuously switched on/off by several times, such as switching the on/off state of the AC power source terminal 110 in continuous several times within a predetermined time, the power supply terminal VDD of the control unit 160 may configure the control unit 160 to enter switching mode due to change in voltage level and adjust the voltage level of the sense voltage Vcs correspondingly. Take a user habit of continuously switching on/off a lamp for example, a first time switching of the user may indicate outputting a sense voltage having a highest power, and a third time of switching of the user may indicate a sense voltage having a lowest power. Therefore, during the time frame between the first switching and the third switching of the user, the control unit 160 is configured to output the sense voltage Vcs having gradually-reduced and different voltage levels at the current sensing terminal CS correspondingly, for the purpose of dynamically adjusting luminance power of the light emitting diode illumination device by multiple levels.

The illumination device power control module 100 further includes capacitor C3 and a diode D4. The capacitor C3 has a first terminal coupled to the first terminal of the inductor L2, and a second terminal coupled to the ground terminal. The diode D4 has a negative bias terminal coupled to the source of the n-type metal-oxide-semiconductor field effect transistor TS and a positive bias terminal coupled to the ground terminal. The capacitor C3 may be used to stabilize the voltage level at the positive output terminal Vo+. The diode D4 may be used as an output rectifier diode.

The illumination device power control module 100 further includes capacitors C6 and C7. The capacitor C6 has a first terminal coupled to a reference voltage terminal COMP of the control unit 160, and a second terminal coupled to a ground terminal of the control unit 160(GND). The capacitor C6 may be used to protect the reference voltage terminal COMP and the ground terminal of the control unit 160(GND). The capacitor C7 has a first terminal coupled to the current sensing terminal CS of the control unit 160, and a second terminal coupled to the second terminal of the capacitor C6. The capacitor C7 may be used to protect the current sensing terminal CS.

The illumination device power control module 100 further includes a capacitor C8 having a first terminal coupled to the first terminal of the rectifier 130, and a second terminal coupled to the second terminal of the rectifier 130. The capacitor C8 may be used to stabilize an output voltage and an input voltage of the rectifier 130.

The illumination device power control module 100 further includes a resistor R8 and a capacitor C9. The resistor R8 has a first terminal coupled to an overvoltage protecting terminal ZCD of the control unit 160, and a second terminal coupled to the second terminal of the regulator 150. The capacitor C9 has a first terminal coupled to the power supply terminal VDD of the control unit 160, and a second terminal coupled to the ground terminal. The resistor R8 may be used to reduce an overvoltage at the output voltage terminal Vo+ and protect the overvoltage protecting terminal ZCD. The capacitor C9 may be used to stabilize a voltage at the power supply terminal VDD.

The control unit 160 has the overvoltage protecting terminal VCD coupled to the second terminal of the regulator 150 and the positive output terminal Vo+. When the voltage level at the positive output terminal Vo+ is higher than an overvoltage level set by the control unit 160 sensed at the overvoltage protecting terminal ZCD, the control unit 160 may stop outputting the sense voltage Vcs for performing overvoltage protection on the light emitting diode illumination device and preventing the voltage level at the positive output terminal Vo+ from further increasing in value.

Figure 2:
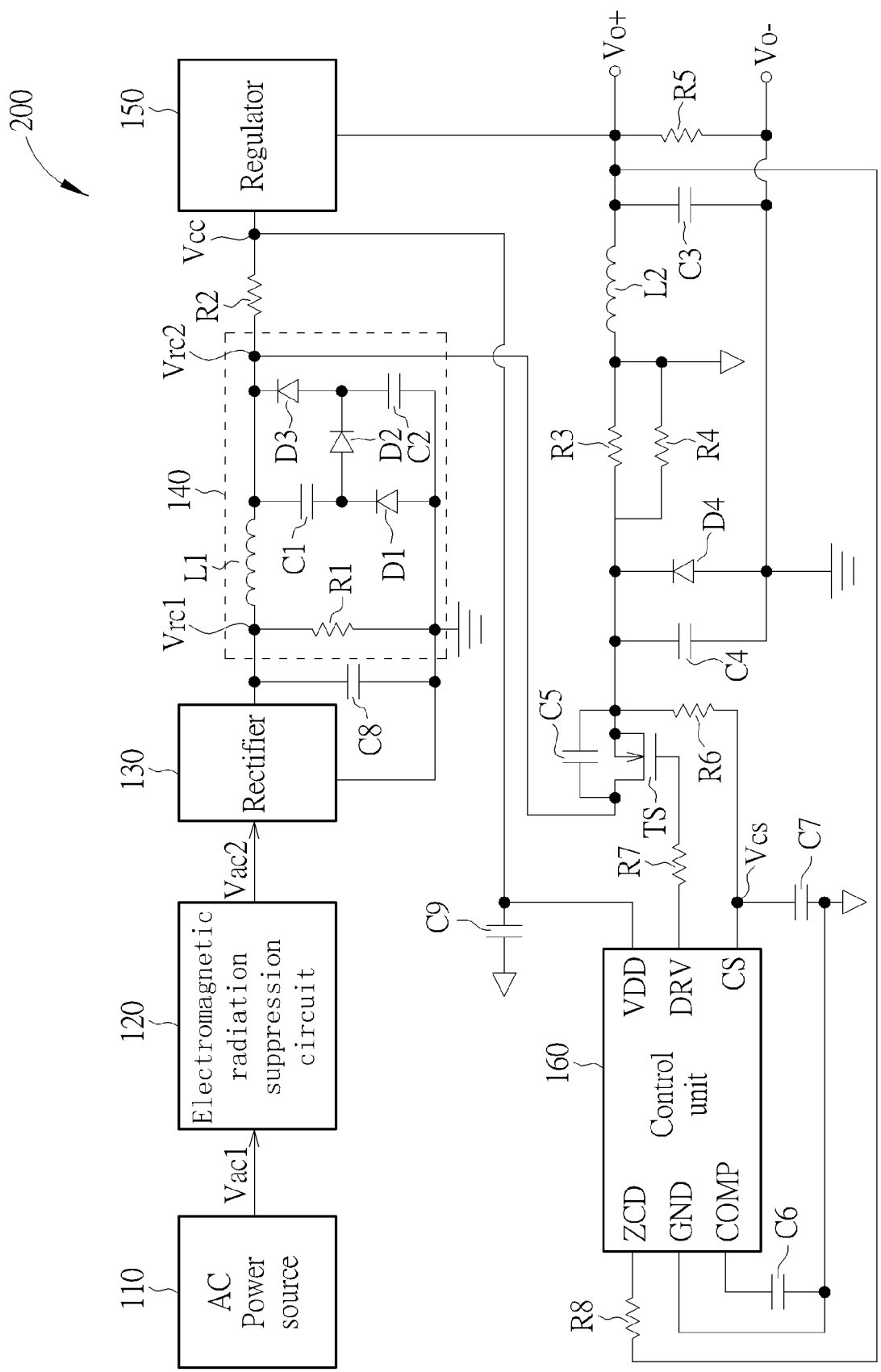

FIG. 2 illustrates an illumination device power control module 200 according to another embodiment of the present invention. The illumination device power control module 200 is an embodiment derived from the illumination device power control module 100 in FIG. 1. Furthermore, the shunt resistor 310 is built internally and further includes an electromagnetic radiation suppression circuit 120, resistors R5, R6, and R7, capacitors C4 and C5.

The electromagnetic radiation suppression circuit 120 may be coupled to the AC power source terminal 110 configured to receive the AC voltage Vac1. After suppressing the electromagnetic radiation of the AC voltage Vac1, an AC voltage Vac2 may be generated. As shown in FIG. 2, the rectifier 130 may be coupled to the electromagnetic radiation suppression circuit 120 for receiving the AC voltage Vac2 and rectifying the AC voltage Vac2 to generate a rectified signal Vrc1.

In the embodiment of the present invention, the first terminal of the resistor R2 may be coupled to the second terminal of the inductor L1.

In the embodiment of the present invention, the regulator 150 has a first terminal coupled to the second terminal of the resistor R2 and a second terminal coupled to the positive output terminal Vo+ of the illumination device power control module 100.

The shunt resistor 310 includes resistors R3 and R4. The resistors R3 and R4 are coupled in parallel. The resistor R3 has a first terminal coupled to the second terminal of the inductor L2 and the ground terminal of the control unit.

The n-type metal-oxide-semiconductor field effect transistor TS has a gate coupled to the drive terminal DRV of the control unit 160, a source coupled to the second terminal of the resistor R3 and the current sensing terminal CS of the control unit 160, and a drain coupled to the second terminal of the inductor L1.

The resistor R5 is coupled in parallel to the capacitor C3. The capacitor C4 is coupled in parallel to the diode D4. The resistor R5 may be used together with the capacitor C3 to stabilize the voltage level in the positive output voltage Vo+. The capacitor C4 may be used to absorb and suppress the surge in the diode D4 during on/off state.

The resistor R6 has a first terminal coupled to the source of the n-type metal-oxide-semiconductor field effect transistor TS and a second terminal coupled to the current sensing terminal CS of the control unit 160. The resistor R7 has a first terminal coupled to the gate of the n-type metal-oxide-semiconductor field effect transistor TS and a second terminal coupled to the drive terminal DRIVE of the control unit 160. The resistor R7 may be used to reduce a current at the drive terminal DRV for protecting the n-type metal-oxide-semiconductor field effect transistor TS. The capacitor C5 has a first terminal coupled to the drain of the n-type metal-oxide-semiconductor field effect transistor TS, and a second terminal coupled to the source of the n-type metal-oxide-semiconductor field effect transistor TS. The capacitor C5 may be used to stabilize a current flowing through the n-type metal-oxide-semiconductor field effect transistor TS to protect the n-type metal-oxide-semiconductor field effect transistor TS.

Figure 3:
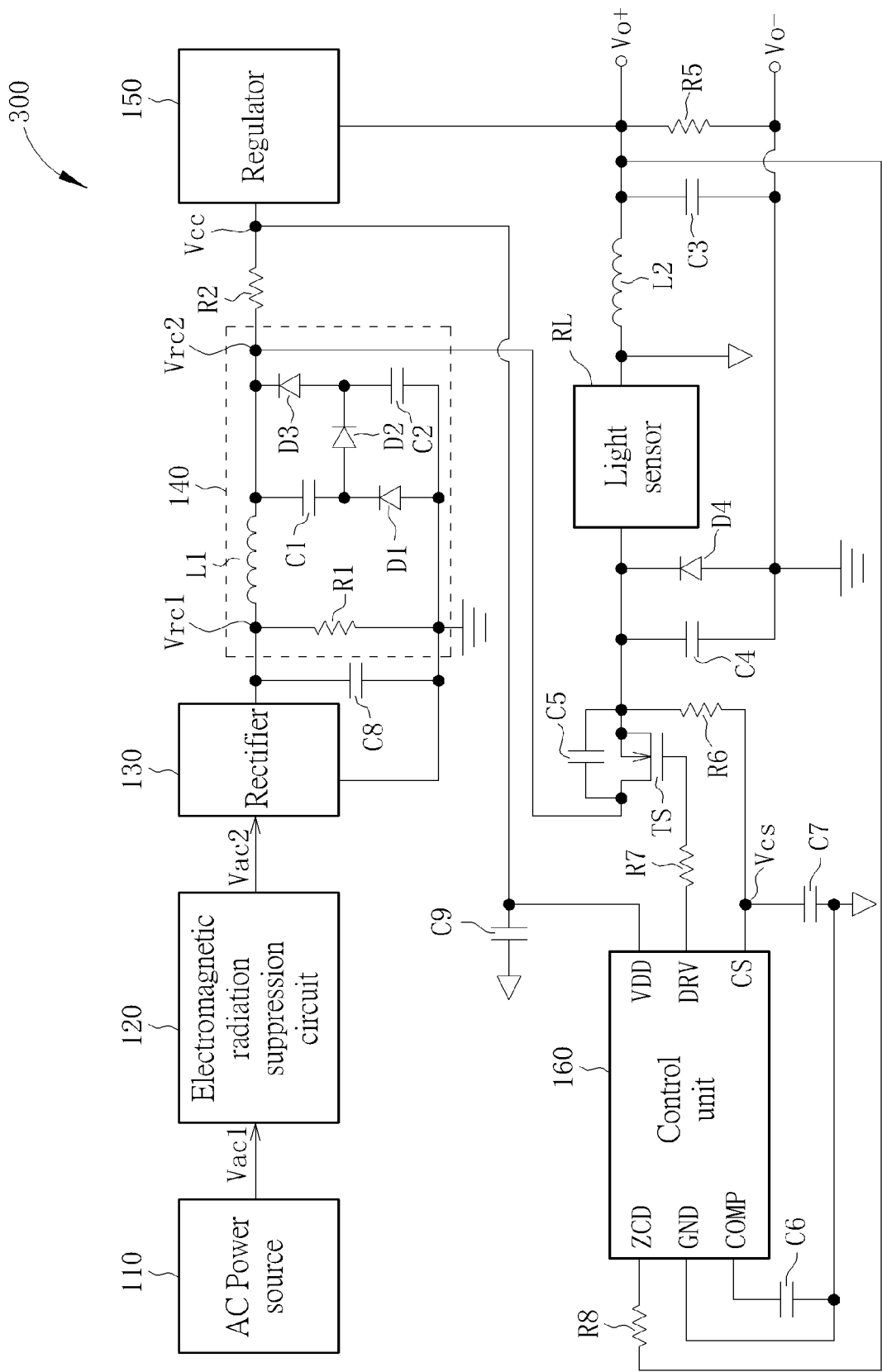

FIG. 3 illustrates an illumination device power control module 300 according to another embodiment of the present invention. The illumination device power control module 300 is an embodiment derived from the illumination device power control module 200 in FIG. 2. There are two differences between the illumination device power control module 300 and the illumination device power control module 200: (1) the illumination device power control module 300 does not utilize the mechanism of detecting the number of times that the lamp switch is switched on/off in a predetermined continuous time for adjusting the sense voltage Vcs correspondingly, whereas the illumination device power control module 200 does; (2) the resistors R3 and R4 utilized in the illumination device power control module 200 are replaced by a light sensor RL in the illumination device power control module 300. Note that resistance value of the light sensor RL is directly proportional to the brightness of the surrounding of the illumination device power control module 300. In other words, the light sensor RL may adjust resistance value according to the brightness of the surrounding of the illumination device power control module 300 in a directly-proportional manner.

The light sensor RL may adjust the resistance value corresponding to the illumination device power control module 200 by the following: (1) when the brightness of the surrounding of the illumination device power control module 200 is increased, the resistance value of light sensor RL increases accordingly to reduce the current at the positive output terminal Vo+ and to reduce brightness of the light emitting diode illumination device; (2) when the brightness of the surrounding of the illumination device power control module 200 is decreased, the resistance value of the light sensor RL decreases accordingly to increase the current at the positive output terminal Vo+ and to increase the brightness of the light emitting diode illumination device. In some embodiments of the present invention, the light sensor RL may include at least one photo resistor and/or at least one thermistor to fulfill the above-mentioned functions of the light sensor RL. Other embodiments of the light sensor RL known to those skilled in the art may be used and details of the other embodiments of the implementation of the light sensor RL are not further described for brevity.

Figure 4:
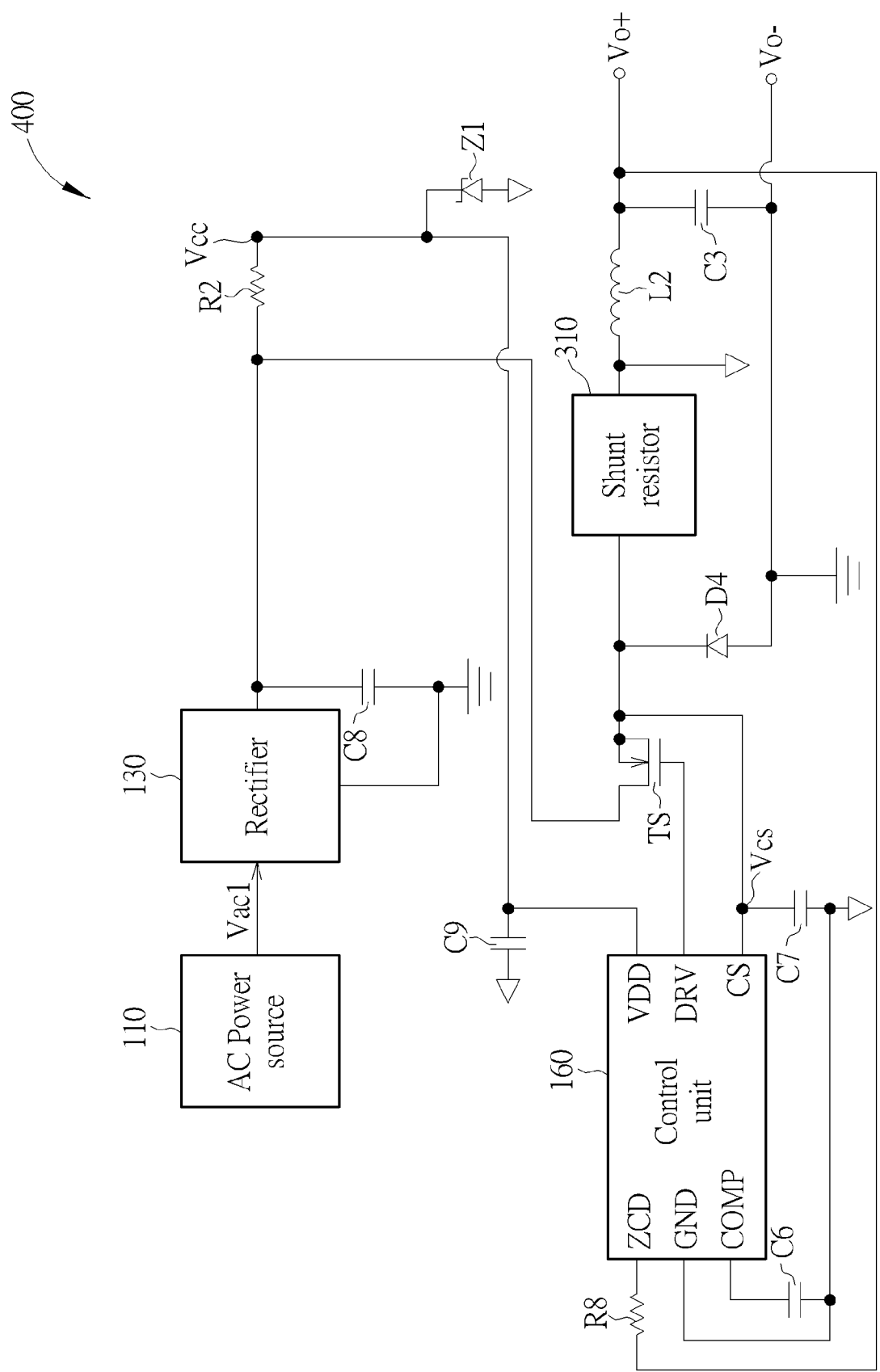

FIG. 4 illustrates an illumination device power control module 400 according to an embodiment of the present invention. The illumination device power control module 400 is an embodiment derived from the illumination device power control module 100 in FIG. 1. As compared to the illumination device power control module 100 in FIG. 1, the illumination device power control module 400 may not include the valley-fill power factor correction circuit 140 and the regulator 150. A first terminal of a zener diode Z1 may be coupled to the second terminal of the resistor R2 in FIG. 1. Other components or functions identical to those in the illumination device power control module 100 are not changed. A second terminal of the zener diode Z1 may be coupled to the ground terminal.

The operation of the illumination device power control module 400 is the same as the operation of the illumination device power control module 100. Therefore, would be able to achieve the same light emission power.

Figure 5:
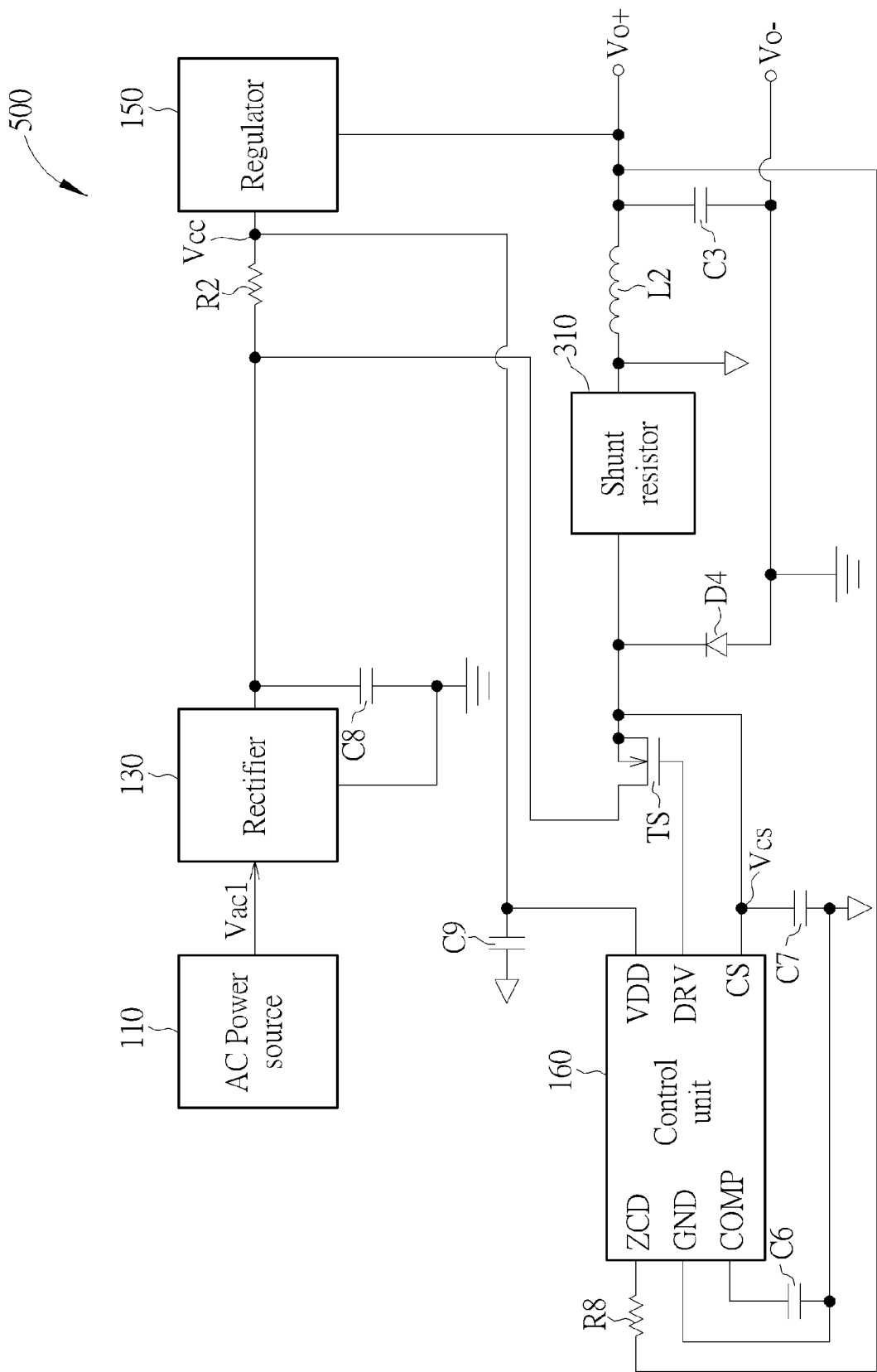

FIG. 5 illustrates an illumination device power control module 500 according to an embodiment of the present invention. The illumination device power control module 500 is an embodiment derived from the illumination device power control module 100 in FIG. 1. As compared to the illumination device power control module 100 in FIG. 1, the illumination device power control module 500 may not include the valley-fill power factor correction circuit 140 and have the second terminal of the rectifier coupled to the first terminal of the resistor R2. Other components or functions identical to those in the illumination device power control module 100 are not changed.

The operation of the illumination device power control module 500 is the same as the operation of the illumination device power control module 100. Therefore, would be able to achieve the same light emission power.

Figure 6:
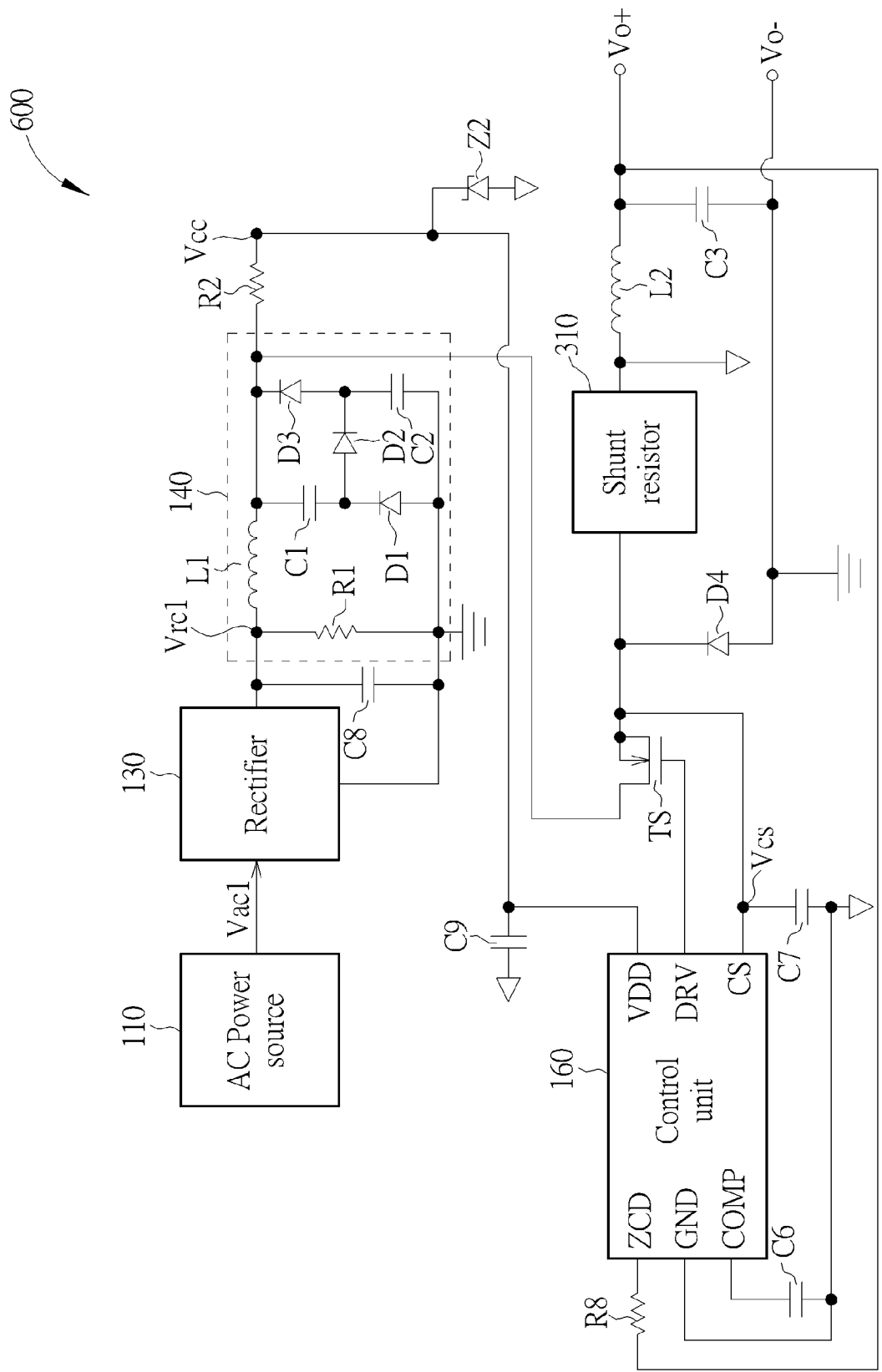

FIG. 6 illustrates an illumination device power control module 600 according to an embodiment of the present invention. The illumination device power control module 600 is an embodiment derived from the illumination device power control module 100 in FIG. 1. As compared to the illumination device power control module 100 in FIG. 1, the illumination device power control module 600 may not include a regulator 150 and further include a zener diode Z2 having a first terminal coupled to the second terminal of the resistor R2 in FIG. 1. Other components or functions identical to those in the illumination device power control module 100 are not changed.

The operation of the illumination device power control module 600 is the same as the operation of the illumination device power control module 100. Therefore, would be able to achieve the same light emission power.

The present invention discloses an illumination device power control module capable of dynamically adjusting output power in multiple levels of a light emitting diode illumination device. With the aid of multiple level adjusting mechanism provided by the illumination device power control module, power consumption of the light emitting diode illumination device can be adjusted corresponding to a user switching to different levels or corresponding to change in brightness of the surrounding. And not wasting additional power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An illumination device power control module, comprising:
 an alternating current (AC) power source terminal, configured to receive an AC voltage;
 a rectifier, configured to convert the AC voltage to a rectified voltage;
 a valley-fill power factor correction circuit, comprising:
  a first inductor, having a first terminal coupled to a first terminal of the rectifier;
  a first resistor, having a first terminal coupled to the first terminal of the first inductor, and a second terminal coupled to a second terminal of the rectifier and a ground terminal;
  a first capacitor, having a first terminal coupled to a second terminal of the first inductor;

a first diode, having a positive bias terminal coupled to the second terminal of the first resistor, and a negative bias terminal coupled to a second terminal of the first capacitor;
a second diode, having a positive bias terminal coupled to the negative bias terminal of the first diode;
a third diode, having a positive bias terminal coupled to a negative bias terminal of the second diode, and a negative bias terminal coupled to the first terminal of the first capacitor; and
a second capacitor, having a first terminal coupled to the positive bias terminal of the third diode, and a second terminal coupled to the positive bias terminal of the first diode;
a regulator, having a voltage supply terminal coupled to the rectifier, the regulator being configured to generate a stable voltage on the voltage supply terminal;
a control unit, having a power supply terminal coupled to the voltage supply terminal of the regulator for receiving the stable voltage, and a current sensing terminal configured to generate a first predetermined potential, and to convert the first predetermined potential to a second predetermined potential according to a change in the stable voltage to perform multistage brightness control, the first predetermined potential being not equal to the second predetermined potential;
a second inductor, having a first terminal coupled to a second terminal of the regulator and a positive output voltage terminal of the illumination device power control module, and a second terminal coupled to a ground terminal of the control unit;
an eighth capacitor, having a first terminal coupled to the first terminal of the rectifier, and a second terminal coupled to the second terminal of the rectifier;
a second resistor, having a first terminal coupled to the second terminal of the first inductor, and a second terminal coupled to a first terminal of the regulator;
a third capacitor, having a first terminal coupled to the first terminal of the second inductor, and a second terminal coupled to the ground terminal;
a sixth capacitor, having a first terminal coupled to a reference voltage terminal of the control unit, and a second terminal coupled to the ground terminal of the control unit;
a seventh capacitor, having a first terminal coupled to the current sensing terminal of the control unit, and a second terminal coupled to the second terminal of the sixth capacitor;
a ninth capacitor, having a first terminal coupled to the first terminal of the rectifier and the power supply terminal of the control unit, and a second terminal coupled to the ground terminal of the control unit;
an eighth resistor, having a first terminal coupled to an overvoltage protection terminal of the control unit, and a second terminal coupled to a second terminal of the regulator;
a shunt resistor, having a first terminal coupled to the second terminal of the second inductor and the ground terminal of the control unit;
a transistor, having a first terminal coupled to a drive terminal of the control unit, a second terminal coupled to a second terminal of the shunt resistor and the current sensing terminal of the control unit, and a third terminal coupled to the second terminal of the first inductor; and
a fourth diode, having a negative bias terminal coupled to the second terminal of the transistor, and a positive bias terminal coupled to the ground terminal.

2. The illumination device power control module of claim 1, further comprising:
an electromagnetic radiation suppression circuit, coupled to the AC power source terminal and the rectifier.

3. The illumination device power control module of claim 1, further comprising:
a fifth resistor, coupled to the third capacitor in parallel; and
a fourth capacitor, coupled to the fourth diode in parallel.

4. The illumination device power control module of claim 1, further comprising:
a sixth resistor, having a first terminal coupled to the second terminal of the transistor, and a second terminal coupled to the current sensing terminal of the control unit;
a seventh resistor, having a first terminal coupled to the first terminal of the transistor, and a second terminal coupled to the drive terminal of the control unit; and
a fifth capacitor, having a first terminal coupled to the third terminal of the transistor, and a second terminal coupled to the second terminal of the transistor.

5. The illumination device power control module of claim 1, wherein the second terminal of the regulator is coupled to the overvoltage protecting terminal of the control unit, and when a voltage level of the second terminal of the regulator is greater than an overload voltage set, the control unit stops outputting a sensing voltage and performs overload protection.

6. The illumination device power control module of claim 1, wherein the rectifier is a half wave rectifier or a full wave rectifier.

7. The illumination device power control module of claim 1, wherein the transistor is an n-type metal-oxide-semiconductor field effect transistor, a p-type metal-oxide-semiconductor field effect transistor, an npn bipolar transistor, a pnp bipolar transistor, an n-type junction field effect transistor, a p-type junction field effect transistor, an n-type metal-semiconductor field-effect transistor, or a p-type metal-semiconductor field-effect transistor.

8. An illumination device power control module, comprising:
an AC power source terminal, configured to receive an AC voltage;
a rectifier, configured to convert the AC voltage to a rectified voltage;
a valley-fill power factor correction circuit, comprising:
a first inductor, having a first terminal coupled to a first terminal of the rectifier;
a first resistor, having a first terminal coupled to the first terminal of the first inductor, and a second terminal coupled to a second terminal of the rectifier and a ground terminal;
a first capacitor, having a first terminal coupled to a second terminal of the first inductor;
a first diode, having a positive bias terminal coupled to the second terminal of the first resistor, and a negative bias terminal coupled to a second terminal of the first capacitor;
a second diode, having a positive bias terminal coupled to the negative bias terminal of the first diode;
a third diode, having a positive bias terminal coupled to a negative bias terminal of the second diode, and a negative bias terminal coupled to the first terminal of the first capacitor; and
a second capacitor, having a first terminal coupled to the positive bias terminal of the third diode, and a second terminal coupled to the positive bias terminal of the first diode;

a regulator, having a voltage supply terminal coupled to the rectifier, the regulator being configured to generate a stable voltage on the voltage supply terminal;

a control unit, having a power supply terminal coupled to the voltage supply terminal of the regulator for receiving the stable voltage, and a current sensing terminal configured to generate a first predetermined potential, and to convert the first predetermined potential to a second predetermined potential according to a change in the stable voltage to perform multistage brightness control, the first predetermined potential is not equal to the second predetermined potential;

a second inductor, having a first terminal coupled to a second terminal of the regulator and a positive output voltage terminal of the illumination device power control module, and a second terminal coupled to a ground terminal of the control unit;

an eighth capacitor, having a first terminal coupled to the first terminal of the rectifier, and a second terminal coupled to the second terminal of the rectifier;

a second resistor, having a first terminal coupled to the second terminal of the first inductor, and a second terminal coupled to a first terminal of the regulator;

a third capacitor, having a first terminal coupled to the first terminal of the second inductor, and a second terminal coupled to the ground terminal;

a sixth capacitor, having a first terminal coupled to a reference voltage terminal of the control unit, and a second terminal coupled to the ground terminal of the control unit;

a seventh capacitor, having a first terminal coupled to the current sensing terminal of the control unit, and a second terminal coupled to the second terminal of the sixth capacitor;

a ninth capacitor, having a first terminal coupled to the first terminal of the rectifier and the power supply terminal of the control unit, and a second terminal coupled to the ground terminal of the control unit;

an eighth resistor, having a first terminal coupled to an overvoltage protection terminal of the control unit, and a second terminal coupled to a second terminal of the regulator;

a shunt resistor, having a first terminal coupled to the second terminal of the second inductor and the ground terminal of the control unit;

an n-type metal-oxide-semiconductor field effect transistor (NMOS transistor), having a gate coupled to a drive terminal of the control unit, a source coupled to a second terminal of the shunt resistor and the current sensing terminal of the control unit, and a drain coupled to the second terminal of the first inductor; and a fourth diode, having a negative bias terminal coupled to the source of the NMOS transistor, and a positive bias terminal coupled to the ground.

9. The illumination device power control module of claim 8, further comprising:

an electromagnetic radiation suppression circuit, coupled to the AC power source terminal and the rectifier.

10. The illumination device power control module of claim 8, further comprising:

a fifth resistor, connected to the third capacitor in parallel; and a fourth capacitor, connected to the fourth diode.

11. The illumination device power control module of claim 8, further comprising:

a sixth resistor, having a first terminal coupled to the source of the NMOS transistor, and a second terminal coupled to the current sensing terminal of the control unit;

a seventh resistor, having a first terminal coupled to the gate of the NMOS transistor, and a second terminal coupled to the drive terminal of the control unit; and a fifth capacitor, having a first terminal coupled to the drain of the NMOS transistor, and a second terminal coupled to the source of the NMOS transistor.

12. The illumination device power control module of claim 8, wherein the second terminal of the regulator is coupled to the overvoltage protecting terminal of the control unit, and when a voltage level of the second terminal of the regulator is greater than an overload voltage set, the control unit stops outputting a sensing voltage and performs overload protection.

13. An illumination device power control module, comprising:

an AC power source terminal, configured to receive an AC voltage;

a rectifier, configured to convert the AC voltage to a rectified voltage;

a valley-fill power factor correction circuit, comprising:
  a first inductor, having a first terminal coupled to a first terminal of the rectifier;
  a first resistor, having a first terminal coupled to the first terminal of the first inductor, and a second terminal coupled to a second terminal of the rectifier and a ground terminal;
  a first capacitor, having a first terminal coupled to a second terminal of the first inductor;
  a first diode, having a positive bias terminal coupled to the second terminal of the first resistor, and a negative bias terminal coupled to a second terminal of the first capacitor;
  a second diode, having a positive bias terminal coupled to the negative bias terminal of the first diode;
  a third diode, having a positive bias terminal coupled to a negative bias terminal of the second diode, and a negative bias terminal coupled to the first terminal of the first capacitor; and
  a second capacitor, having a first terminal coupled to the positive bias terminal of the third diode, and a second terminal coupled to the positive bias terminal of the first diode;

a regulator, having a voltage supply terminal coupled to the rectifier, the regulator being configured to generate a stable voltage on the voltage supply terminal;

a control unit, having a power supply terminal coupled to the voltage supply terminal of the regulator for receiving the stable voltage, and a current sensing terminal configured to generate a first predetermined potential and to convert the first predetermined potential to a second predetermined potential according to a change in the stable voltage to perform multistage brightness control, the first predetermined potential is not equal to the second predetermined potential;

a second inductor, having a first terminal coupled to a second terminal of the regulator and a positive output voltage terminal of the illumination device power control module, and a second terminal coupled to a ground terminal of the control unit;

an eighth capacitor, having a first terminal coupled to the first terminal of the rectifier, and a second terminal coupled to the second terminal of the rectifier;

a second resistor, having a first terminal coupled to the second terminal of the first inductor, and a second terminal coupled to a first terminal of the regulator;

a third capacitor, having a first terminal coupled to the first terminal of the second inductor, and a second terminal coupled to the ground terminal;

a sixth capacitor, having a first terminal coupled to a reference voltage terminal of the control unit, and a second terminal coupled to the ground terminal of the control unit;

a seventh capacitor, having a first terminal coupled to the current sensing terminal of the control unit, and a second terminal coupled to the second terminal of the sixth capacitor;

a ninth capacitor, having a first terminal coupled to the first terminal of the rectifier and the power supply terminal of the control unit, and a second terminal coupled to the ground terminal of the control unit;

an eighth resistor, having a first terminal coupled to an overvoltage protection terminal of the control unit, and a second terminal coupled to a second terminal of the regulator;

a light sensor, having a first terminal coupled to the second terminal of the second inductor and the ground terminal of the control unit, the light sensor having a resistance value adjusted to be proportional to brightness of around the illumination device power control module;

an n-type metal-oxide-semiconductor field effect transistor (NMOS transistor), having a gate coupled to a drive terminal of the control unit, a source coupled to a second terminal of the light sensor and the current sensing terminal of the control unit, and a drain coupled to the second terminal of the first inductor; and a fourth diode, having a negative bias terminal coupled to the source of the NMOS transistor, and a positive bias terminal coupled to the ground.

14. The illumination device power control module of claim 13, further comprising:
an electromagnetic radiation suppression circuit, coupled to the AC power source terminal and the rectifier.

15. The illumination device power control module of claim 13, further comprising:
a fifth resistor, connected to the third capacitor in parallel; and
a fourth capacitor, connected to the fourth diode.

16. The illumination device power control module of claim 13, further comprising:
a sixth resistor, having a first terminal coupled to the source of the NMOS transistor, and a second terminal coupled to the current sensing terminal of the control unit;
a seventh resistor, having a first terminal coupled to the gate of the NMOS transistor, and a second terminal coupled to the drive terminal of the control unit; and
a fifth capacitor, having a first terminal coupled to the drain of the NMOS transistor, and a second terminal coupled to the source of the NMOS transistor.

17. The illumination device power control module of claim 13, wherein the second terminal of the regulator is coupled to the overvoltage protecting terminal of the control unit, and when a voltage level of the second terminal of the regulator is greater than an overload voltage set, the control unit stops outputting a sensing voltage and performs overload protection.

18. The illumination device power control module of claim 13, wherein the light sensor comprises a photo resistor and/or a thermistor.

19. An illumination device power control module, comprising:
an AC power source terminal, configured to receive an AC voltage;
a rectifier, configured to convert the AC voltage to a rectified voltage;
a regulator, having a voltage supply terminal coupled to the rectifier, the regulator being configured to generate a stable voltage on the voltage supply terminal; and
a control unit, having a power supply terminal coupled to the voltage supply terminal of the regulator for receiving the stable voltage, and a current sensing terminal configured to generate a first predetermined potential, and to convert the first predetermined potential to a second predetermined potential according to a change in the stable voltage to perform multistage brightness control, the first predetermined potential is not equal to the second predetermined potential.

20. The illumination device power control module of claim 19, further comprising:
an eighth capacitor, having a first terminal coupled to the first terminal of the rectifier, and a second terminal coupled to the second terminal of the rectifier;
a second resistor, having a first terminal coupled to the first terminal of the rectifier, and a second terminal coupled to a first terminal of the regulator;
a second inductor, having a first terminal coupled to a second terminal of the regulator and a positive output voltage terminal of the illumination device power control module, and a second terminal coupled to a ground terminal of the control unit;
a third capacitor, having a first terminal coupled to the first terminal of the second inductor, and a second terminal coupled to the ground terminal;
a sixth capacitor, having a first terminal coupled to a reference voltage terminal of the control unit, and a second terminal coupled to the ground terminal of the control unit;
a seventh capacitor, having a first terminal coupled to the current sensing terminal of the control unit, and a second terminal coupled to the second terminal of the sixth capacitor;
a ninth capacitor, having a first terminal coupled to the first terminal of the rectifier and the power supply terminal of the control unit, and a second terminal coupled to the ground terminal;
an eighth resistor, having a first terminal coupled to an overvoltage protection terminal of the control unit, and a second terminal coupled to a second terminal of the regulator;
a shunt resistor, having a first terminal coupled to the second terminal of the second inductor and the ground terminal of the control unit;
a transistor, having a first terminal coupled to a drive terminal of the control unit, a second terminal coupled to a second terminal of the shunt resistor and the current sensing terminal of the control unit, and a third terminal coupled to the first terminal of the rectifier; and
a fourth diode, having a negative bias terminal coupled to the second terminal of the transistor, and a positive bias terminal coupled to ground terminal.

21. An illumination device power control module, comprising:
an AC power source terminal, configured to receive an AC voltage;
a rectifier, configured to rectify the AC voltage to a rectified voltage;

a control unit, having a power supply terminal coupled to a first terminal of the rectifier for receiving a stable voltage, and a current sensing terminal configured to generate a first predetermined potential, and to convert the first predetermined potential to a second predetermined potential according to a change in the stable voltage to perform multistage brightness control, the first predetermined potential is not equal to the second predetermined potential; and a zener diode, having a first terminal coupled to the first terminal of the rectifier, and a second terminal coupled to the ground terminal of the control unit.

22. The illumination device power control module of claim 21, wherein a valley-fill power factor correction circuit is coupled to the rectifier and the power supply terminal of the control unit, the valley-fill power factor correction circuit comprising:

a first inductor, having a first terminal coupled to a first terminal of the rectifier;

a first resistor, having a first terminal coupled to the first terminal of the first inductor, and a second terminal coupled to a second terminal of the rectifier and a ground terminal;

a first capacitor, having a first terminal coupled to a second terminal of the first inductor;

a first diode, having a positive bias terminal coupled to the second terminal of the first resistor, and a negative bias terminal coupled to a second terminal of the first capacitor;

a second diode, having a positive bias terminal coupled to the negative bias terminal of the first diode;

a third diode, having a positive bias terminal coupled to a negative bias terminal of the second diode, and a negative bias terminal coupled to the first terminal of the first capacitor; and a second capacitor, having a first terminal coupled to the positive bias terminal of the third diode, and a second terminal coupled to the positive bias terminal of the first diode.

23. The illumination device power control module of claim 22, further comprising:

an eighth capacitor, having a first terminal coupled to the first terminal of the rectifier, and a second terminal coupled to the second terminal of the rectifier;

a second resistor, having a first terminal coupled to the second terminal of the first inductor, and a second terminal coupled to the power supply terminal of the control unit;

a second inductor, having a first terminal coupled to a positive output voltage terminal of the illumination device power control module, and a second terminal coupled to a ground terminal of the control unit;

a sixth capacitor, having a first terminal coupled to a reference voltage terminal of the control unit, and a second terminal coupled to the ground terminal of the control unit;

a seventh capacitor, having a first terminal coupled to the current sensing terminal of the control unit, and a second terminal coupled to the second terminal of the sixth capacitor;

a ninth capacitor, having a first terminal coupled to the second terminal of the first inductor and the power supply terminal of the control unit, and a second terminal coupled to the ground terminal of the control unit;

an eighth resistor, having a first terminal coupled to an overvoltage protection terminal of the control unit, and a second terminal coupled to a first terminal of the second inductor;

a shunt resistor, having a first terminal coupled to the second terminal of the second inductor and the ground terminal of the control unit;

a transistor, having a first terminal coupled to a drive terminal of the control unit, a second terminal coupled to a second terminal of the shunt resistor and the current sensing terminal of the control unit, and a third terminal coupled to the second terminal of the first inductor; and a fourth diode, having a negative bias terminal coupled to the second terminal of the transistor, and a positive bias terminal coupled to ground terminal.

* * * * *